Figure 1:
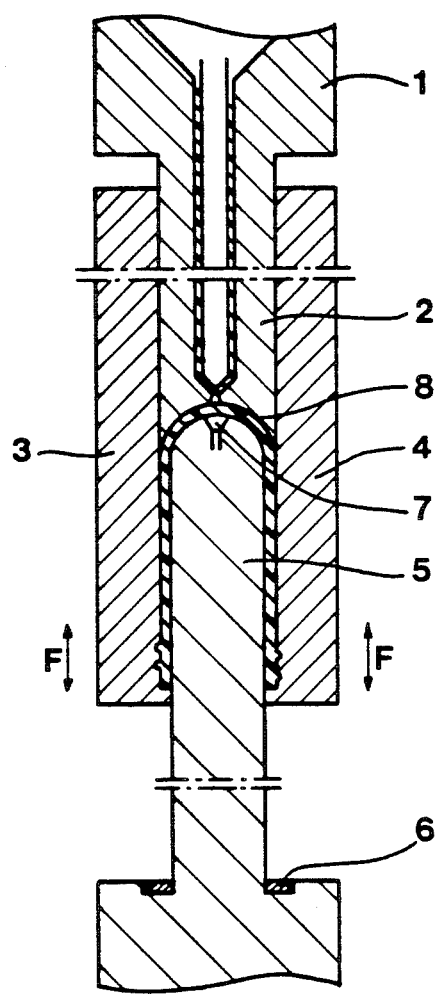

United States Patent [19]

Depreter

[11] Patent Number: 4,781,573
[45] Date of Patent: Nov. 1, 1988

[54] DEVICE FOR INJECTION MOULDING TUBULAR PREFORMS MADE OF A THERMOPLASTIC

[75] Inventor: Michel Depreter, Waterloo, Belgium

[73] Assignee: Solvay & Cie (Société Anonyme), Brussels, Belgium

[21] Appl. No.: 17,210

[22] Filed: Feb. 20, 1987

[30] Foreign Application Priority Data

Feb. 24, 1986 [FR] France ............................. 86.02619

[51] Int. Cl.$^4$ ............................................. B29B 11/06
[52] U.S. Cl. .................................................... 425/577
[58] Field of Search ............... 425/522, 528, 529, 533, 425/537, 150, 542, 577, 352, 355; 249/122, 124, 176, 177, 180

[56] References Cited

U.S. PATENT DOCUMENTS

| | | | |
|---|---|---|---|
| 2,801,444 | 8/1957 | Lovenian | 18/30 |
| 3,409,709 | 11/1968 | Cleereman et al. | 425/150 |
| 3,778,211 | 12/1973 | Moen et al. | 425/245 |
| 3,966,378 | 6/1976 | Valyi | 425/150 |
| 4,332,545 | 6/1982 | Cargile | 425/577 |
| 4,632,657 | 12/1986 | Potoczky | 425/577 |

FOREIGN PATENT DOCUMENTS

| | | | |
|---|---|---|---|
| 211037 | 9/1960 | Austria | 425/577 |
| 740565 | 1/1933 | France . | |
| 1043163 | 11/1953 | France . | |

Primary Examiner—Bernard Nozick
Attorney, Agent, or Firm—Spencer & Frank

[57] ABSTRACT

The tubular preform is injection moulded in an injection mould whose initially axially reduced injection cavity is progressively enlarged in the direction of the axis of the preform in step with its filling by the injected thermoplastic until a moulding cavity is obtained which corresponds to the volume and to the shape of the preform to be produced. To this end, the injection mould comprises external die-halves and a central core, which can be moved in relation to each other in the direction of their common lengthwise axis during the injection moulding cycle.

5 Claims, 9 Drawing Sheets

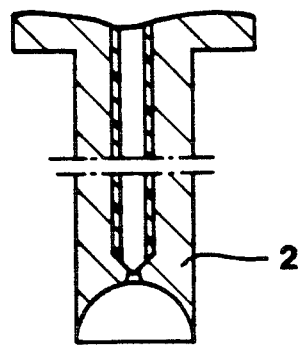
FIG. 3
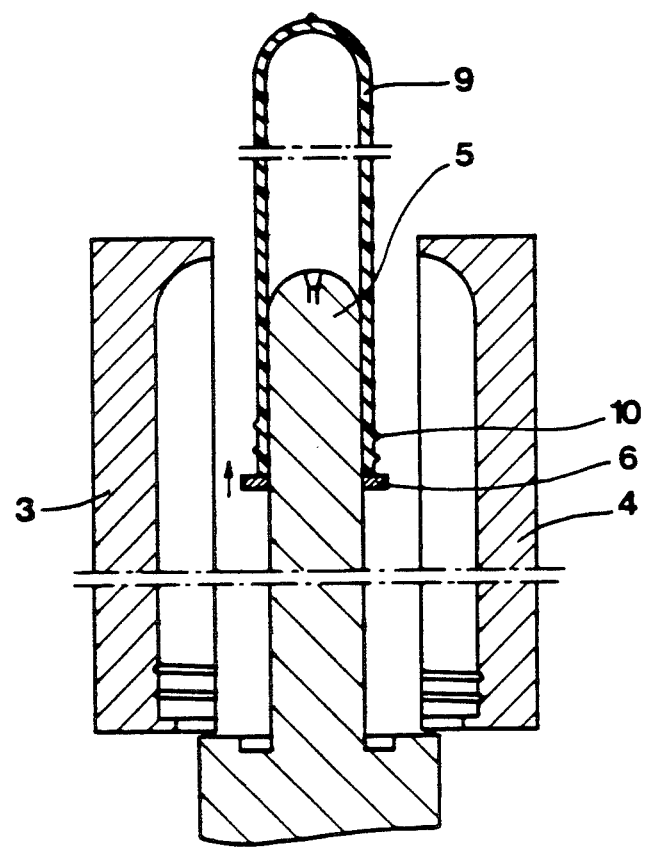

DEVICE FOR INJECTION MOULDING TUBULAR PREFORMS MADE OF A THERMOPLASTIC

The present invention relates to a process and a device for injection-moulding tubular preforms made of a thermoplastic of low thickness and great length, which are especially suitable for the production of bottles by blow-moulding, and more particularly of molecularly biaxially oriented bottles, of a capacity greater than one liter.

The technology for producing bottles made of certain thermoplastics, biaxially oriented if desired, by injection-moulding a preform and subsequent blow-moulding of this preform is at present limited in respect of the capacity of the bottles which can be produced.

In fact, because of the limitation on the degree of extendability of certain thermoplastics, particularly at their molecular orientation temperatures, and because of the limitation on the diameter of the injection-moulded preforms, related to their neck diameter, it becomes necessary, when large-capacity bottles are to be produced, to make preforms which have a length of over 150 mm and a fairly low thickness of the order of 1 to 2 mm.

Thus, for example, to make a traditional bottle made of biaxially oriented polyvinyl chloride, with a capacity of 1.5 l, weighing 40 g and having a neck with an internal diameter of 24 mm, an injection-moulded preform which has a length of 200 mm and a wall thickness of 1.7 mm has to be made first.

These two parameters, low thickness and great length, represent considerable obstacles to correct injection moulding of preforms in an industrial plant, which involves:

single-point injection high precision of injection need to avoid any risk of thermal degradation of the constituent material, and high thickness uniformity.

Now, the fact that it is necessary to injection-mould preforms of great length and low thickness gives rise, in particular, to a risk of incomplete injection or of injection moulding of preforms of a non-uniform thickness as a result of an offset and/or a distortion of the inner core of the injection mould.

The purpose of the present invention is, consequently, to provide a process and a device which make it possible to eliminate the abovementioned problems and which open the way to industrial production of preforms made of a thermoplastic of great length and low thickness, which are of high quality and which are completely suitable for the production of bottles and, in particular, of biaxially oriented bottles.

The process for injection-moulding tubular preforms made of a thermoplastic of low thickness and of great length in accordance with the invention is characterized in that injection moulding of the thermo-plastic is performed in a preform injection mould in which the initially axially reduced volume of the injection cavity is progressively enlarged in the direction of the lengthwise axis of the preform in step with its being filled by the injected thermoplastic and until a final moulding cavity is obtained with a volume and a shape corresponding to that of the preform to be produced, the ratio of the reduced volume to the final volume of the moulding cavity being between 1:1.5 and 1:100.

When this procedure is followed, it appears that the injected thermoplastic needs to follow only a very limited path in the injection cavity, and this reduces any risk of setting-up of this material and hence of an incomplete filling of the injection cavity. Furthermore, the injection cavity reaches its maximum length only at the end of the injection cycle, and this reduces any risk of offset or distortion of the core of the injection mould, this core being, moreover, supported and held by the solidifying thermoplastic injected at the beginning of the injection-moulding cycle. Furthermore, in the process according to the invention it is unnecessary to raise the injected thermoplastic to a maximum temperature compatible with its stability in order to make it as fluid as possible and, consequently, any risk of thermal degradation is reduced, particularly when heat-sensitive thermoplastics such as polyvinyl chloride are employed. Lastly, in the process according to the invention, the injection pressure can be considerably lower, and this further reduces the risk of an offset of the injection core.

According to a preferred embodiment of the process, the progressive enlargement of the volume of the injection cavity is controlled as a function of the rate of injection of the injected thermoplastic so as to keep the injected thermoplastic constantly under pressure. These means also contribute to the complete elimination of any risk o incomplete filling of the injection cavity.

In an embodiment of the process which may be found advantageous, part or all of the internal walls of the injection mould may be lubricated to promote the flow of the injected thermoplastic and to reduce any friction between the injected preform and the components of the injection mould during the injection-moulding cycle.

The invention also relates to a device which is especially adapted for implementing the process according to the invention.

The device according to the invention comprises an injection-moulding press equipped with an injection nozzle and at least one injection mould consisting of two complementary external die-halves, and a coaxial internal core defining an injection cavity which is characterized in that the two external die-halves and the internal core are capable of being moved relative to each other in the direction of their common lengthwise axis during the injection moulding cycle.

The relative movement of the components of the injection mould may be produced by any suitable means and especially by means of hydraulic, pneumatic or mechanical controls. These means are, preferably, controlled as a function of the injection rate of the injection moulding press.

In the device according to the invention, at the beginning of an injection moulding cycle the two external die-halves and the internal core of the injection mould are arranged so that these components define between them an injection cavity of a volume which is smaller when compared with the volume of the preform to be moulded, it being possible for the ratio of these volumes to vary between 1:1.5 and 1:100 and preferably between 1:2 and 1:50.

During the injection-moulding cycle of a preform, these same components are moved relative to each other so as to progressively enlarge axially the volume of the injection cavity and to increase this to the volume and the shape of the preform to be moulded.

As already stated, the means producing this relative movement of the components of the injection mould are, preferably, controlled by the injection rate of the material of which the preform is made. In general, this control is preferably such that the injection pressure is kept constant during the injection-moulding cycle.

The progressive enlargement of the volume of the injection cavity in the axial direction may, at will, be produced by keeping the internal core stationary and by simultaneously moving axially the two external die-halves, by keeping the two external die-halves stationary and by moving the central core axially or, alternatively, by moving the internal core axially and the two external die-halves axially in opposite directions.

As is normal practice, the internal core and the two external die-halves are equipped with refrigeration devices and the internal core may be equipped with an air-connection valve which is used when the preform is demoulded, it being possible to produce this demoulding in particular by means of a mechanical ejector associated with the internal core and actuated after the injection mould has been opened at the end of the injection moulding cycle.

According to an embodiment of the device according to the invention which is found to be advantageous, when a single injection mould is used, the end of the injection nozzle may advantageously be given a profile such that it forms the external bottom of the injection mould in cooperation with the two external die-halves.

According to another embodiment of the device according to the invention which is found to be advantageous, when an injection moulding press equipped with a plurality of injection moulds is used, the injection moulds may comprise an external bottom component which can be moved relative to the external die-halves.

Lastly, in the device according to the invention, it is generally preferable that the external die-halves and the internal core define an initial injection cavity permitting the final moulding of the neck of the preform to be produced. To this end, the cavities of the external die-halves may include the die sinking required to mould the neck of the preform to be produced immediately following the start of the injection moulding cycle.

The device according to the invention and its operation are, furthermore, explained in further detail in the following descriptions of two preferential embodiments, given by way of illustration. The first relates to a device comprising a single injection mould and the second to a device which can be equipped with a plurality of injection moulds mounted, for example, on a revolver barrel system.

Figure 2:
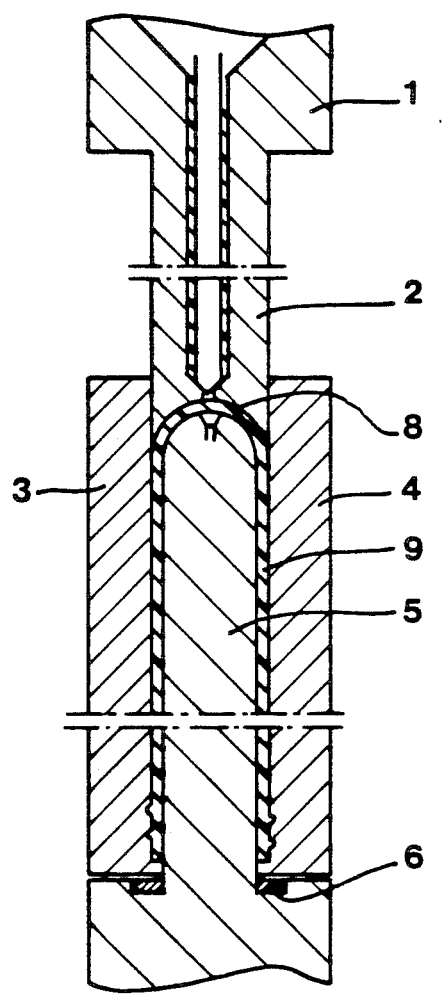

In these descriptions, reference will be made to the figures in the attached drawings, in which:

FIGS. 1 to 3 show, in section, the first device in various stages of its operation during a cycle of the injection moulding of a tubular preform, and FIGS. 4 to 9 show, in section, the second device, also in various stages of its operation during a cycle of the injection moulding of a tubular preform.

First device

As can be seen in FIGS. 1 to 3, the device according to the invention comprises an injection moulding press 1, part of which is shown, equipped with an injection nozzle 2 and an injection mould principally comprising two external die-halves 3, 4 and a coaxial internal core 5 equipped with an ejector 6 and an air-connection valve 7, part of which is shown. The end 8 of the injection nozzle 2 is hemispherical in shape, so as to form the external bottom of the injection mould in cooperation with the two external die-halves 3, 4. Lastly, in accordance with the invention, the two external die-halves 3, 4 may be moved axially in the direction of the arrows F by means which are not shown.

At the beginning of the injection moulding cycle of a preform 9, as shown in FIG. 1, the two external die-halves 3, 4 are in a high position so that, together with the internal core 5, they define an initial injection cavity whose volume is markedly smaller than that of the preform 9 to be produced.

During the injection, the two external die-halves 3, 4 are moved downwards, so as to progressively increase the volume of the injection cavity in the axial direction. The progressive and simultaneous movement of the two external die-halves is produced at such a rate that, taking into account the rate of injection of the press, the thermoplastic injected into the injection cavity remains under a constant pressure. When the injection is complete, the two die-halves occupy the position shown in FIG. 2, and, together with the end 8 of the injection nozzle 2 and with the internal core 5, define a cavity which corresponds precisely to the required tubular preform.

As soon as the tubular preform 9 injection moulded in this manner is sufficiently cooled, the two external die-halves 3, 4 are moved sideways (FIG. 3) and the preform 9, moulded and separated from the end of the injection nozzle 2, may be extracted from the inner core 5 by means of the ejector 6.

It should also be noted that the sinkings of the two external die-halves 3, 4 are engraved so as to make it possible to produce a moulded preform 9 equipped with a moulded neck 10 in its final form.

With the device thus described, it is possible to produce tubular preforms of great length and of very uniform wall thickness, which are completely suitable for blow-moulding hollow articles and especially for moulding hollow articles which are molecularly biaxially oriented by means of preliminary heat conditioning of the preforms.

Second device

As can be seen in FIGS. 4 to 9, the device according to the invention also comprises an injection moulding press 11, part of which is shown, equipped with an injection nozzle 12 and a plurality of injection moulds, one of which is shown, chiefly comprising two external die-halves, 13, 14 and a coaxial internal core 15 equipped with an ejector 16 and an air-connection valve 17, part of which is shown. Each injection mould additionally comprises an external bottom component 18 of tubular shape which fits coaxially around the injection nozzle 12. The end portion of the external bottom component has a profile according to the shape to be given to the preform 19 to be moulded, and this end portion comprises a central injection channel 20 coaxial with the injection nozzle 12. The other end of the external bottom component 18 is equipped with an external annular flange 21 which may be integrally fastened to an annular flange 22 provided on the injection nozzle 12 by means of removable jaws 23. The jaws 23 thus make it possible to integrally fasten the external bottom component 18 to the injection nozzle 12 when this bottom component 18 is slipped as far as it will go onto the injection nozzle 12. According to the invention, the two external die-halves 13, 14 can be moved axially in the direction of the arrows $F_1$ and along the external bottom component 18 and the central core 15, by means which are not shown.

Figure 4:
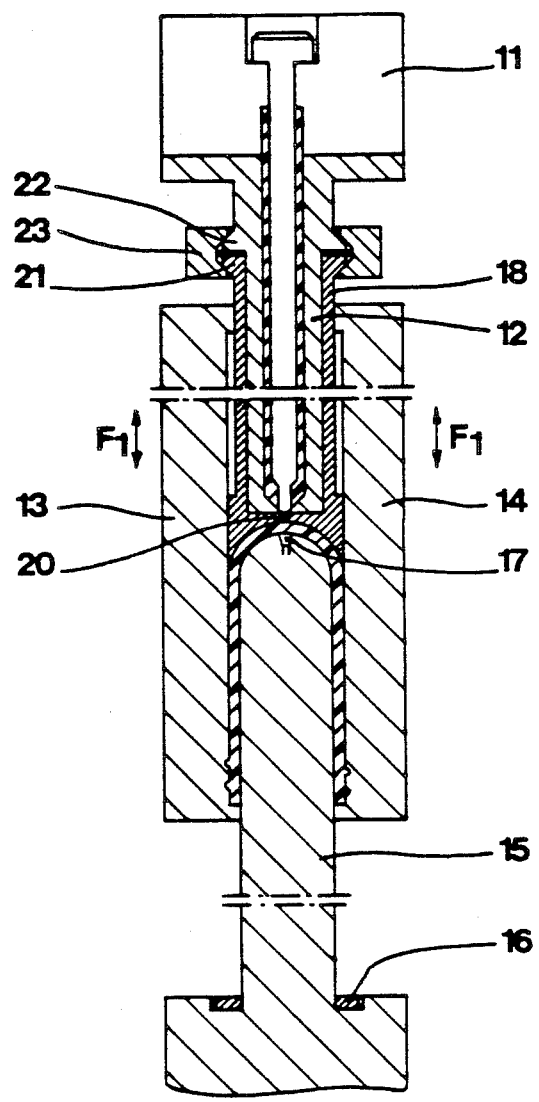
Figure 5:
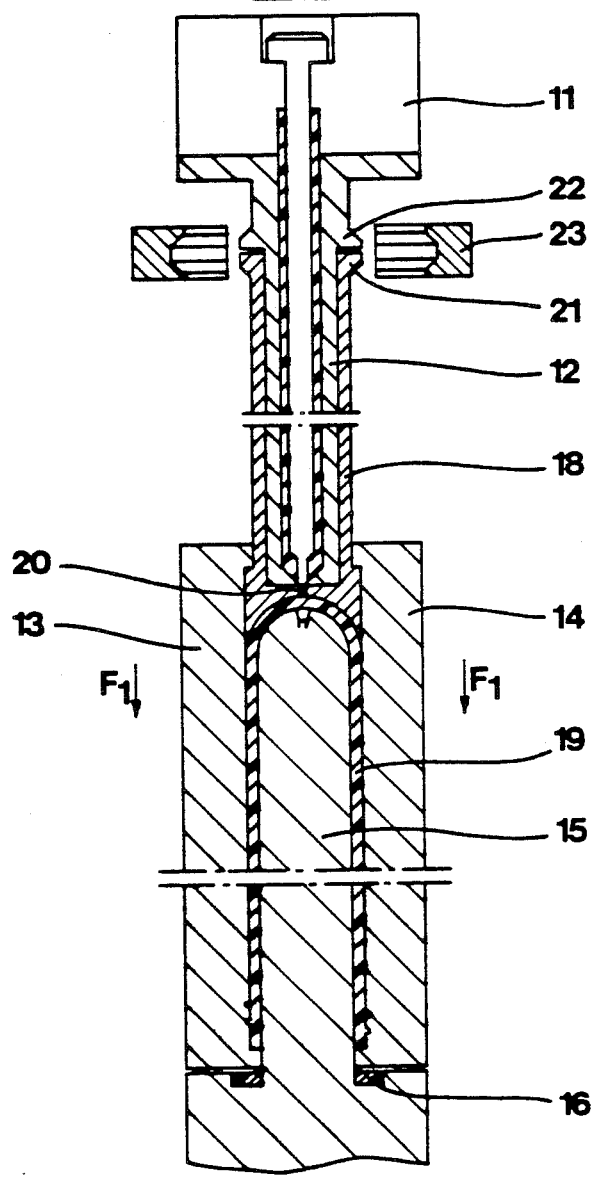

At the beginning of an injection moulding cycle of a preform 19 such as shown in FIG. 4, the operating injection mould is in a high position. In this position, the bottom external component 18 is slipped as far as it will go onto the injection nozzle 12 and is integrally fastened to the latter by means of movable jaws 23. In addition, the external die-halves 13, 14 also occupy a high position and, together with the external bottom component 18 and with the internal core 15, define an injection cavity of a volume which is axially smaller when compared with the volume of the preform 19 to be produced.

During the injection of the thermoplastic, the two external die-halves 13, 14 are progressively moved axially downwards (FIG. 5) so as to axially enlarge the injection cavity and to increase the latter to the volume and to the shape of the preform 19 to be produced.

Figure 6:
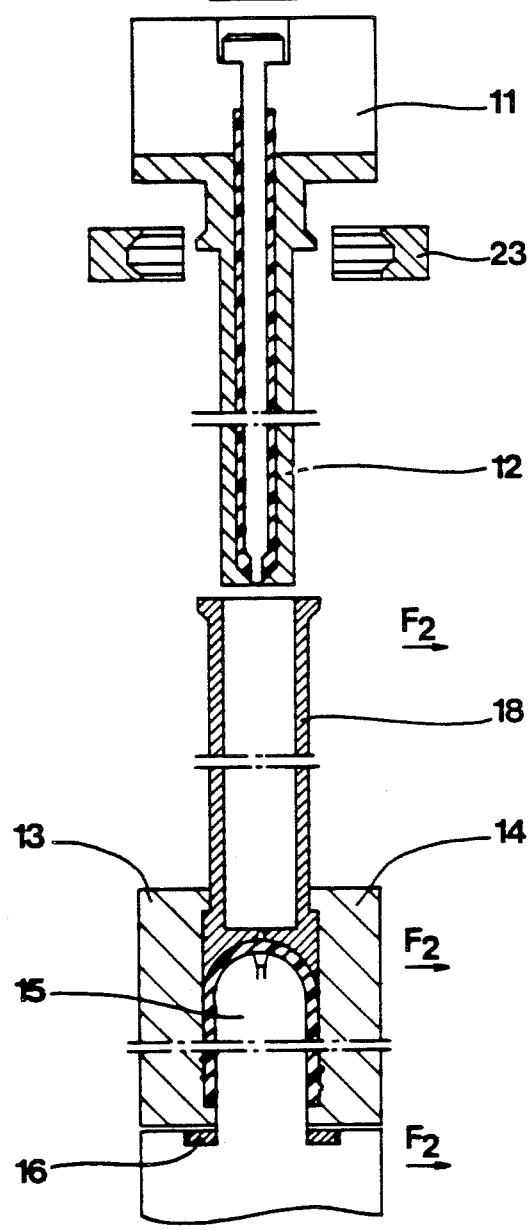
Figure 7:
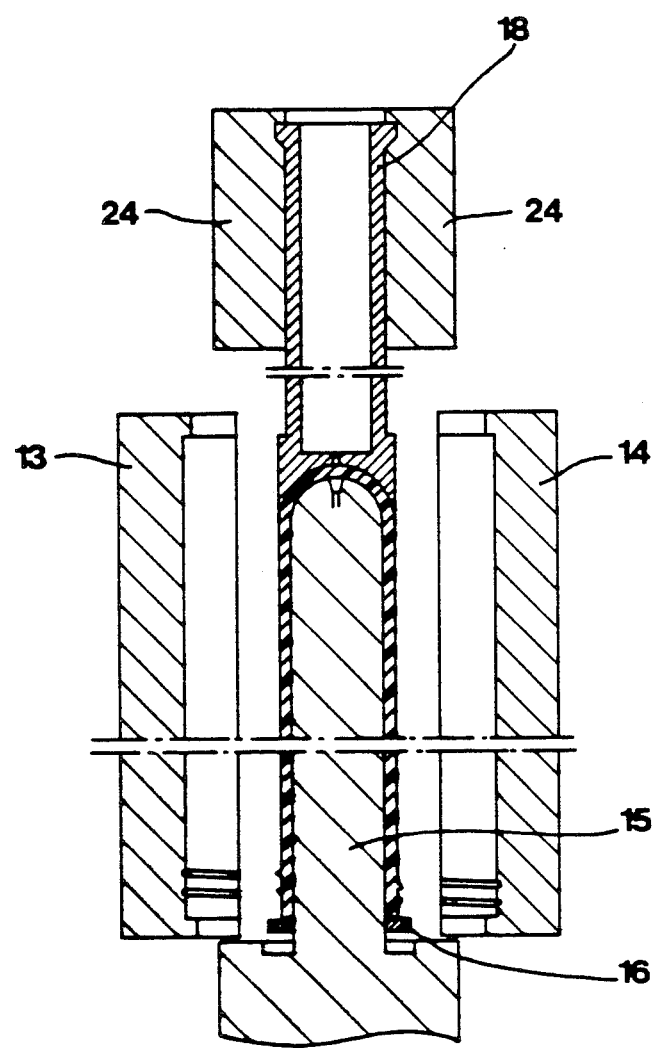
Figure 8:
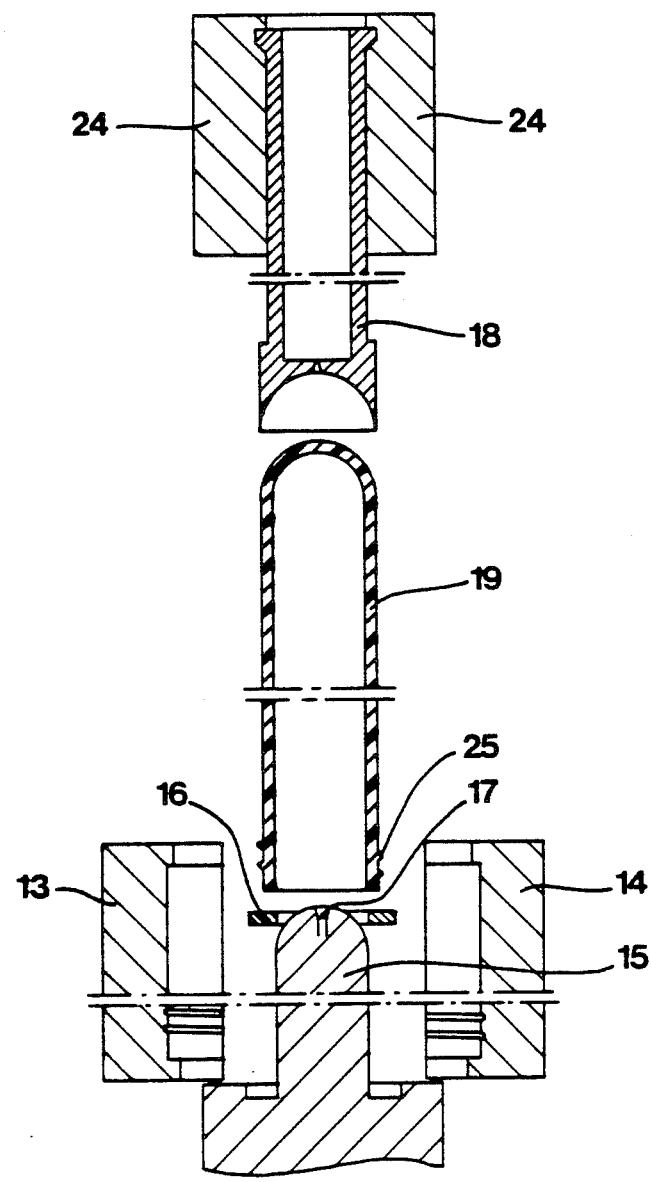

When the injection moulding cycle is complete, the removable jaws 23 release the external bottom component 18 and the whole of the injection mould, consisting of the external die-halves 13, 14, moves downwards and is released from the injection nozzle (FIG. 6).

When the external bottom component 18 is completely released from the injection nozzle (FIG. 6), the injection mould is moved sideways (arrows F₂) towards an ejection station (FIG. 7) travelling, if appropriate, via several intermediary cooling stations in succession, and another injection mould may be brought up directly into an operating position vertically in line with the injection nozzle 12.

When the mould reaches the ejection station (FIG. 7), movable jaws 24 seize the part of the external bottom component 18 which projects from the injection mould and are responsible for holding this component while the external die-halves are moved sideways apart from each other so as to release the mould preform 19 which remains held on the internal core 15.

After this separation, the movable jaws 24 are moved upwards and the ejector 16 can extract the preform from the internal core 15 (FIG. 8), the air-connection valve 17 being open.

Figure 9:
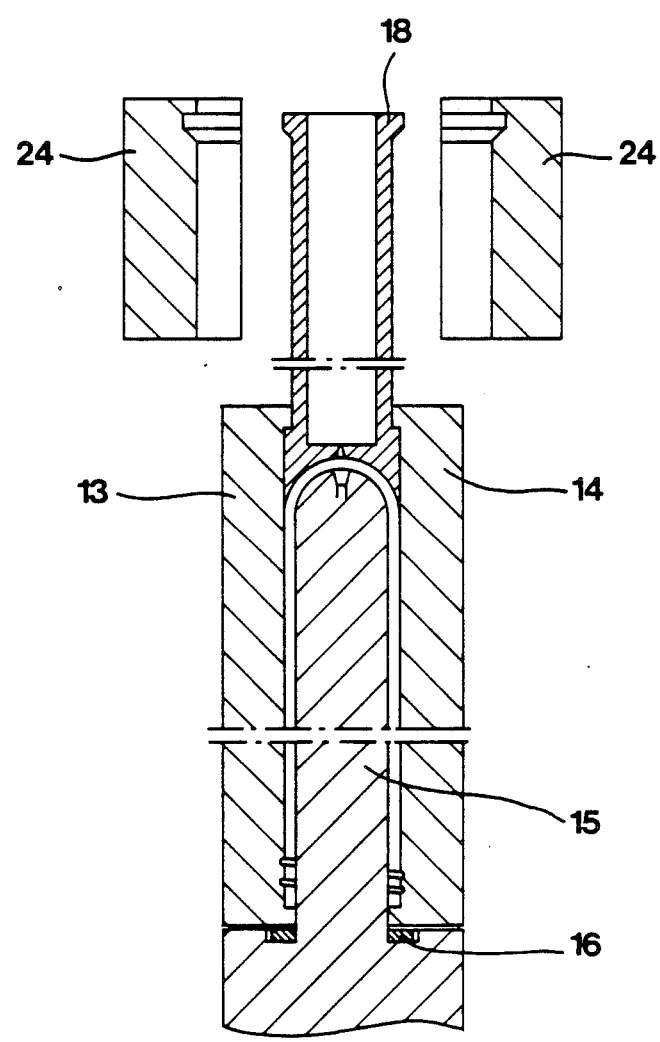

After ejection of the preform, the movable jaws 24 are returned to their initial position by a downward movement and the external die-halves 13, 14 are brought back together to re-form the injection mould around the external bottom component 18, which can then be released by the movable jaws 24 (FIG. 9).

The injection mould is then again brought into a position vertically in line with the injection nozzle 12 in order to be capable of performing a new injection moulding cycle.

To this end, the injection mould is moved axially upwards until the external bottom component 18 has been placed back in position on the injection nozzle 12 and the latter is held by the jaws 23 and until the external die-halves 13, 14 have been placed back in the starting position (FIG. 4).

It should also be noted that the sinkings of the two external die-halves 13, 14 are also engraved so as to make it possible to produce a moulded preform 19 equipped with a moulded neck 25 in its final form.

The device such as described makes it possible to use a plurality of injection moulds used in succession and permits the production, with good unit production output, of tubular preforms of uniform wall thickness and great length which are completely suitable for the production of hollow articles by blow-moulding and, in particular, of molecularly biaxially oriented hollow articles.

I claim:

1. In a device for injection molding a tubular perform of a thermoplastic, the perform having a longitudinal axis, a small wall thickness and a great length parallel to the longitudinal axis, which device is composed or an injection-molding press equipped with an injection nozzle, and at least one injection mold, the injection mold including an external die and an internal core, the injection nozzle extending into the die, the internal core being insertable into the die in the direction of the longitudinal axis for causing the die and the core to define a cavity in which the preform is formed, the press including means to fill the cavity with injected thermoplastic from the nozzle, the die being composed of two die-halves which are movable relative to one another transverse to the longitudinal axis, the improvement wherein when said core is moveable into said die to define said cavity, said core and said die are supported by supporting means to provide for progressive movement of said core and said die relative to one another parallel to the longitudinal axis to expand said cavity axially by said progressive movement during an injection by said nozzle of a preform from a staring position in which the length of the cavity is less than the length of the tubular preform to a final position in which the cavity corresponds in length, shape and volume to the tubular preform, during filling of the cavity with injected thermoplastic via said nozzle, with the ratio of the volume of the cavity in the starting position to the volume of the cavity in the final position being 1:1.5 to 1:100.

2. A device as defined in claim 1 wherein said press is configured, in the vicinity of said outlet end of said nozzle, to form the external bottom of said cavity in cooperation with said die.

3. A device as defined in claim 1 wherein said injection mold further comprises an external bottom means mounted for movement in said die.

4. A device as defined in claim 1 wherein at least one of said die and said core is formed for forming a molded neck on the preform.

5. A device as defined in claim 1 wherein said core has a free end direction toward said press, said free end is configured to form the interior bottom surface of the preform, and said press and said core are mounted to remain fixed relative to one another during a preform molding operation while said core and said die undergo progressive relative movement from the starting position to the final position.

* * * * *